United States Patent
Norcross

[15] 3,686,931
[45] Aug. 29, 1972

[54] DETECTOR FOR VISCOSITY MEASURING SYSTEM

[72] Inventor: Austin S. Norcross, Newton, Mass.

[73] Assignee: Norcross Corporation, Newton, Mass.

[22] Filed: Feb. 12, 1970

[21] Appl. No.: 10,799

[52] U.S. Cl. .................................................73/57
[51] Int. Cl. .................................................G01n 11/12
[58] Field of Search .........................73/57, 54, 208

[56] References Cited

UNITED STATES PATENTS

| 2,491,389 | 12/1949 | Norcross | 73/57 |
| 2,630,819 | 3/1953 | Norcross | 73/57 X |
| 3,290,923 | 12/1966 | Norcross | 73/57 |
| 3,304,765 | 2/1967 | Norcross | 73/57 |
| 3,371,522 | 3/1968 | Norcross | 73/57 |

FOREIGN PATENTS OR APPLICATIONS

| 1,465,669 | 1/1967 | France | 73/57 |
| 899,369 | 6/1962 | Great Britain | 73/57 |

Primary Examiner—Louis R. Prince
Assistant Examiner—Joseph W. Roskos
Attorney—Roberts, Cushman & Grover

[57] ABSTRACT

Viscosity measuring apparatus with relatively movable cylinder and piston for continuous detection by predetermined cycling of the movement for measuring the viscosity of fluid flowing within a duct. The apparatus uses a cylinder transversely of such duct carrying the supervised fluid and provisions are made for assuring uniform temperature distribution at the cylinder and piston, with continuous flow of the fluid. The measuring system is adapted to operate as a closed system, that is, it can be arranged to communicate with the duct but not with regions external to the duct.

22 Claims, 10 Drawing Figures

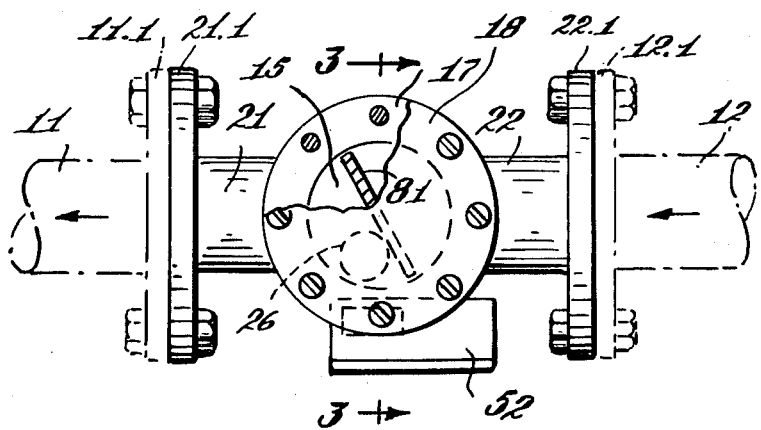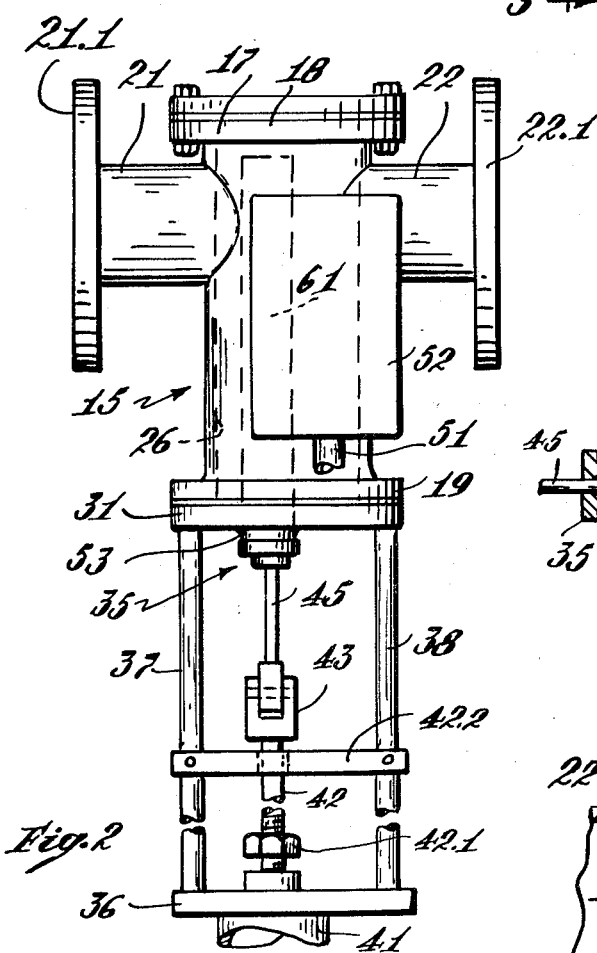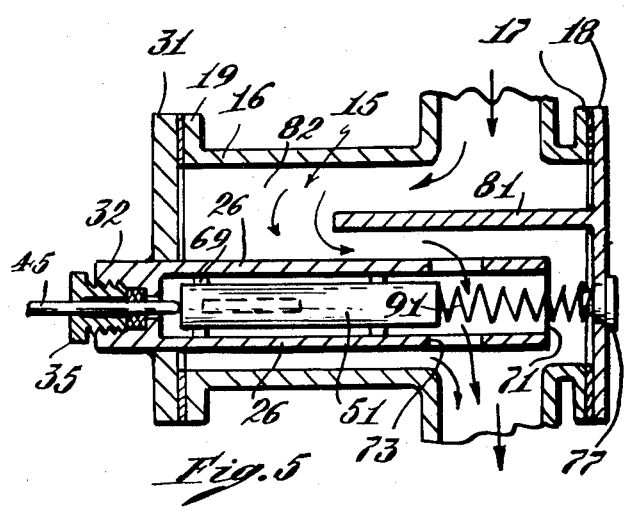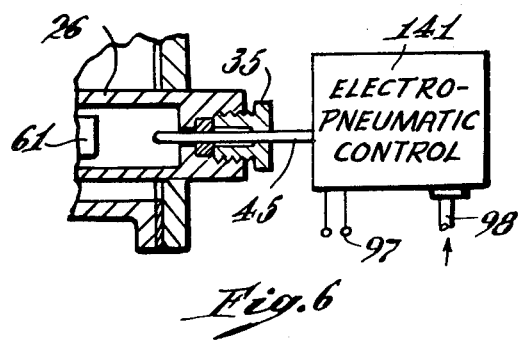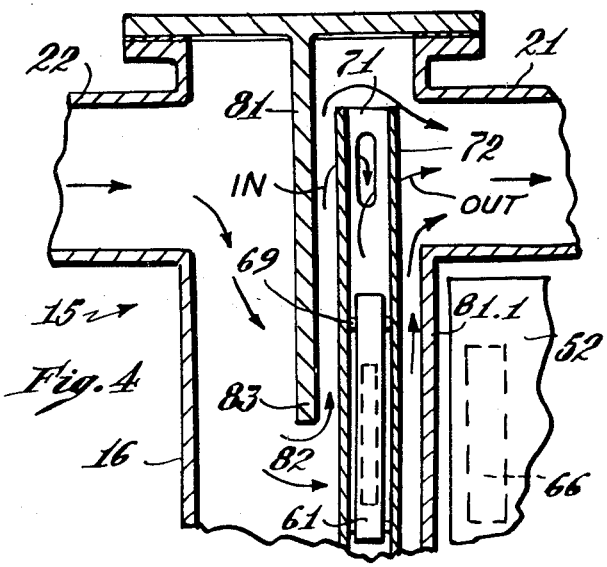
Fig.1
Fig.2
Fig.5
Fig.6
Fig.4

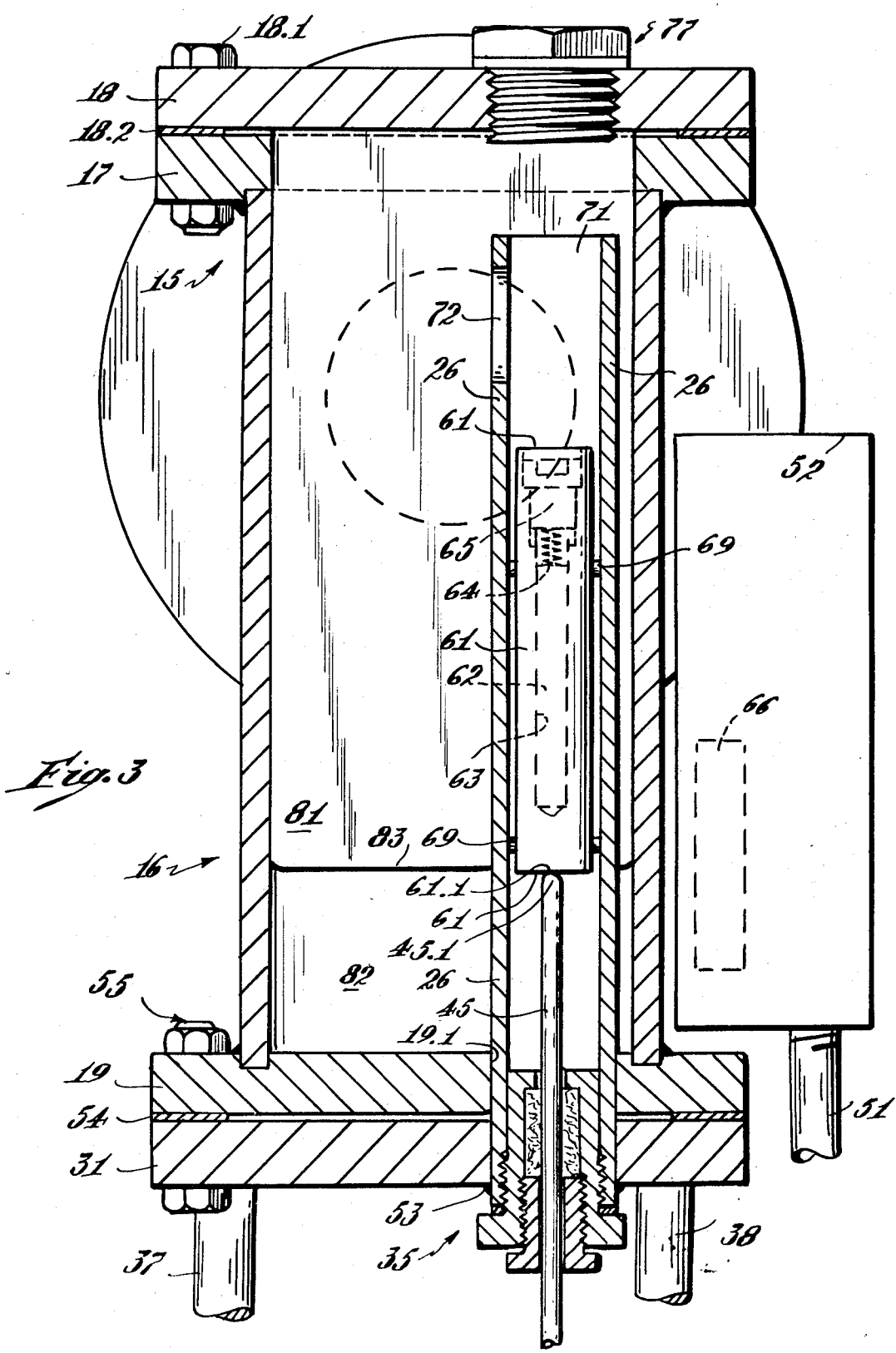

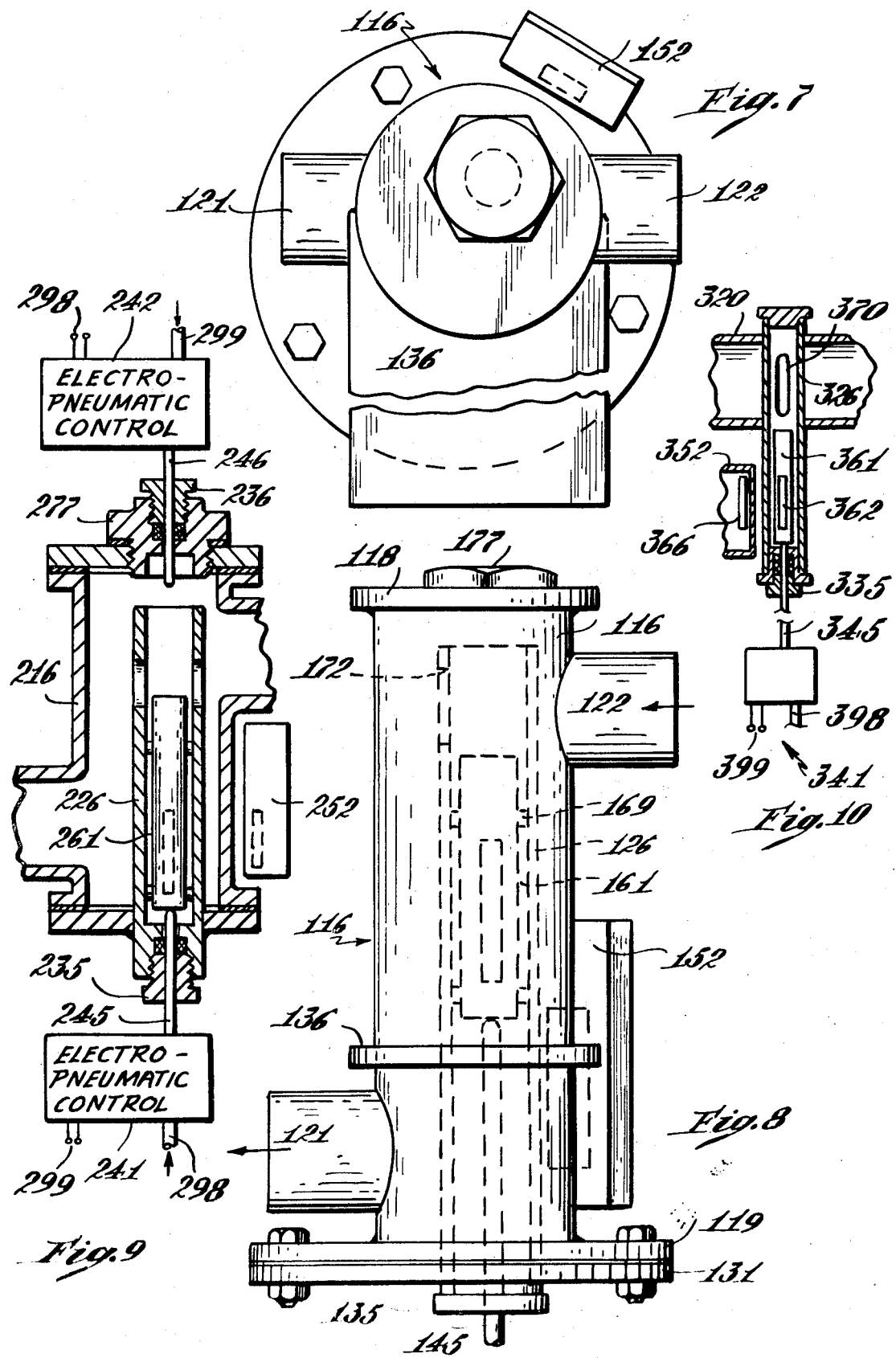

DETECTOR FOR VISCOSITY MEASURING SYSTEM

BACKGROUND OF THE INVENTION

1. Field of the Invention.

The invention relates to testing of liquid or liquid suspension of solids by way of internal resistance e.g. viscosity manifesting itself by a shearing torque between parallel surfaces.

More specifically, the field of this invention is viscosity measurement by forcing a fluid through a restricted orifice defined by two relatively movable bodies, preferably with concentric cylindrical gap defining surfaces. The duration of a predetermined relative measuring movement of the surfaces is detected and suitable indicating means are responsive to such duration of movement of the measuring bodies which in the present instance is cyclically repeated under control of the indicating means.

2. Description of the Prior Art

Viscosity measuring devices of this general class are described in my U.S. Pats. No. 2,491,389 of Dec. 13, 1949, No. 3,290,923 of Dec. 13, 1966, No. 3,304,765 of Feb. 21, 1967, and No. 3,371,522 of Mar. 5, 1968. Systems of this type should impede as little as possible the flow of fluid to be supervised even if it is very heavy, it should be possible to install them by way of standard flange connections, and they should be continuously self-cleaning, explosionproof and corrosion resistant, as well as rugged and dependable. While my previously patented viscometer systems are satisfactory in these respects, they are not under all circumstances optimal with regard to ease of installation, of even flow, and especially also with regard to sensitivity to misleading temperature variations at the measuring gap which should conform to the temperature of the fluid flow prevailing in the duct proper. Such drawbacks of the prior art devices, especially irregular sensitivity to temperature variations, and inaccuracy due to flow impeding configuration of the measuring apparatus, are optimally improved by the present invention.

SUMMARY OF THE INVENTION

In its principal aspect the invention is characterized by the arrangement, in the flow path of a fluid moving in a duct, of a compartment for measuring means operating on the above mentioned principle of viscosity measuring. The measuring means in themselves are old, comprising an envelope and a measuring body reciprocating therein, the envelope and the body defining a viscosity measuring gap. The compartment can be separate from the envelope, or the envelope itself can constitute the compartment. In accordance with the invention, the compartment with the envelope, or the envelope, are so arranged relatively to the flow defining duct that the liquid is deflected and distributed around, along, and within the envelope such that the temperatures of the fluid and the envelope with contents are equalized in order to compensate for variation of temperature at the gap which would otherwise be uncontrollably affected by the ambient temperatures of the fluid, of a more or less tortuous duct, and of the compartment and envelope as they are exposed to the environment.

In accordance with another important aspect of the invention, the envelope has a port near the initial measuring position of the measuring body which carries a magnetic component and is located as near as feasible to an outside detecting device such as a proximity switch. Eccentric arrangement of the envelope promotes deflection and distribution of the fluid as well as favorable cooperation of the measuring means and the detecting means.

A further important aspect of the invention is concerned with structure specifically provided for promoting fluid deflection and distribution, such as baffle means within a compartment for the envelope, or duct ports leading into and from the compartment at a considerable distance, such as at opposite ends of the envelope.

Still another aspect of the invention is concerned with spring and push rod arrangements to which the present construction lends itself particularly well. A single rod can be used at one end of the measuring body or if desired a spring instead.

In a further aspect, two push rods, one at each end of the measuring body are used, the two push rods being controllably moved for propelling the measuring body during its measuring and return movements; these two push rods can be cyclically operated, one for driving the measuring body into initial position ready for its measuring transversal of the envelope and the other for driving the body while it measures viscosity. This system of positive control with two push rods can be used with or without the temperature equalizing correlation of duct means, compartment means, and measuring means.

Objects of the invention which, among others, result from the above outlined characteristic features of the invention are to provide, generally speaking, improved apparatus using a proven principle of operation regarding which experience has been acquired over a long time in diversified industries with both Newtonian and non-Newtonian liquids, such as in blending, coating, dipping, spraying, sizing, diluting, fuel burning, cooking, oil bodying, impregnating, extruding, pumping, printing, homogenizing, and polymerizing; and more specifically, to provide a continuously self-cleaning system of this type wherein each measuring cycle flushes the measuring gap effectively for self-cleaning during operation regardless of orientation of the system to avoid erroneous readings and maintenance difficulties occasioned by accumulation of solid particles which might separate or settle out from the fluid which is being measured;

to provide such a system which is explosion-proof, corrosion resistant, rugged and dependable, and easily installed in existing pipe lines;

to provide according to a particularly characteristic feature of the invention, for temperature equalization at a region of measuring located essentially directly in the duct, making unnecessary or compensate for duct deviations which might affect the temperature balance; and to provide such a system which can be cyclically operated in any desired position with definitely predetermined measuring and return strokes and which will be self-cleansing in any such position.

BRIEF DESCRIPTION OF THE DRAWINGS

FIG. 1 is a top elevation of an installation according to the invention;

FIG. 2 is a side elevation corresponding to FIG. 1;

FIG. 3 is a section on lines 3–3 of FIG. 1;

FIG. 4 is a schematic representation of the fluid distribution characteristic of installations according to FIGS. 1 to 3;

FIG. 5 is a modification of the construction according to FIGS. 1 to 3 incorporating a spring which is effective during the measuring stroke;

FIG. 6 illustrates a modification wherein the spring of FIG. 5 is replaced by a push rod with electropneumatic control;

FIG. 7 is a top elevation similar to FIG. 1 of a further embodiment of the invention with off set conduit ports;

FIG. 8 is a side elevation corresponding to FIG. 7;

FIG. 9 is an embodiment incorporating two push rods for positively controlled cycling; and FIG. 10 illustrates an embodiment wherein the envelope assumes one of the functions of the compartment according to FIGS. 1 to 9.

DESCRIPTION OF PREFERRED EMBODIMENTS

Referring to FIGS. 1 and 2, a fluid carrying duct is indicated by conventional pipes 11 and 12 with flanges 11.1 and 12.1. The measuring compartment 15 consists of a tube section 16 with a flange 17 and a cover plate 18 at one end, and a closure plate 19 at the other end. The plate 19 is apertured at 19.1 (FIG. 3) to fit the measuring cylinder 26 as will be described below. The compartment 15 has two pipe stubs 21, 22 with flanges 21.1, 22.1. The plate 19 is fastened to a cylinder supporting disc 31 mounted on a platform 36 by means of legs two of which are shown in FIG. 2 at 37, 38. The platform 36 also carries an electropneumatic control device which is indicated at 41, and it can also support, if desired, a conduit 51 leading to the proximity magnet device 52. The driving stud 42 (FIG. 2) of the electropneumatic control is at 43 coupled to the push rod 45.

As shown in FIGS. 3 and 4, the measuring means proper is constructed as follows. The envelope component of the measuring gap, here a cylindrical tube 26, is at 53 welded to the disc 31 which is bolted to the compartment closure plate 19 as indicated at 55. The envelope or cylinder 26 passes through the aperture 19.1 of the closure plate 19 and it extends with an interiorly threaded stub beyond disc 31 at the weld 53.

A gasket 54 is interposed between plate 19 and disc 31. The cylinder 26 is in this manner sealed toward the outside. Within the cylinder 26 is confined the measuring body in the form of a piston 61 containing a magnetic body 62 in an appropriate cavity 63 of the piston and held therein by means of a spring 64 and a screw cap 65 as shown in FIG. 3. The magnetic measuring body 62 cooperates with an appropriately shaped magnetic detecting body 66 of the proximity switching device 52 from which the conventionally appropriate electric connections emerge through the above-mentioned conduit 51. The push rod 45 passes, as indicated in FIG. 3, through a conventional stuffing box 35 screwed into the stub of cylinder 26 where it is welded to disc 31. The push rod has a rounded tip 45.1 which is adapted to contact the smooth end 61.1 of the piston 61. The piston carries six distancing pins, three mounted in each of two transverse planes. One of these pins is indicated at 69 in the figures. These distancing pins or projections are quite important for the purpose of maintaining an exact and non-varying measuring gap with predictable temperature variations that can be compensated in the indicating component of the installation, especially if the cylinder is used in non-vertical position. The cylinder 26 has an open top 71 and adjacent thereto an aperture such as window 72 which is mainly relied on for supplying the fluid to be measured to the measuring gap as will be explained below with reference to FIG. 4.

The cover plate 18 is fastened to the flange 17 by means of bolts 18.1, with a sealing gasket 18.2 therebetween. A threaded plug 77 is provided in plate 18, for the purpose of inspecting the measuring component with cylinder 26 and piston 61 and for pulling the piston from the cylinder if desired. It will be apparent that the plug 77 together with the removable disc 31 and stuffing box 35 permit easy assembly, inspection and exchange of the measuring component.

A rectangular baffle plate 81 is with a short side welded to the cover plate 18 at 81.1 (FIG. 4) and the two longer sides extend with comfortable fit along opposite regions of the interior cylindrical wall of compartment 16, leaving a passage 82 between the other short side 83 and the closure plate 19 of the compartment. As indicated in FIG. 4, this baffle diverts the flow path of the liquid coming from stub 22 down the baffle plate 81 around its edge 83, up in the space between the baffle plate and the wall portion 81.1 of the compartment along the cylinder 81, and proceeding partly directly and partly over the opening 71 of the cylinder into the stub 21. The opening 71 and the window 72 admit fluid into, and discharge it from the cylinder wherein the piston 61 reciprocates. Temperature differences between fluid and measuring component are in this manner equalized due to the large contact surface and considerable duration of interface contact between fluid and measuring components. The distancing pins 69 continuously maintain the correct fluid measuring gap between cylinder and piston. In this embodiment, the piston descends by gravity pull during the measuring stroke and is lifted to initial measuring position by the push rod as will be further described herein below.

Under certain conditions, for example if the liquid to be measured is of high viscosity or if gravity cannot be relied on for the measuring stroke, an arrangement according to FIG. 5 is useful, wherein a spring 91 is interposed between the piston 61 and the plug 77. This figure incorporates the baffle construction of FIGS. 1, 3 and 4 and also indicates the possibility of providing a second window 73 opposite window 72, for passage of fluid into the cylinder and removal therefrom at alternate strokes of the piston in opposite directions. As shown in FIG. 6, the assist spring 91 can be replaced by control apparatus programmed by an indicating component 141 for example similar to the electropneumatic drive 41 discussed above. Fig 6 shows at 97 the electric connections leading from 141 to the indicating component, and at 98 an energy source such as compressed air.

The above described construction with a baffle plate provides, for purposes of invention, especially favorable fluid flow diversion and elongation around the measuring component. It was however found that other deflecting and distributing means can often be advantageously used, and such a modification will now be described with reference to FIGS. 7 and 8.

In FIGS. 7 and 8, the compartment 116 has two stubs 121 and 122 for the fluid, a cover plate 118 with plug 177 and a supporting disc 131 bolted to the closure plate 119. A mounting bracket 136 serves for holding the compartment with the measuring and detecting components. This bracket can suitably be fixed to a mounting structure corresponding to that of FIG. 2. A cylinder 126, a piston 161, a distancer 169, a window 172 of the cylinder, a push rod 145 with stuffing box 235, and a proximity device 152 are shown in FIGS. 7 and 8 and it will be noted that they correspond closely to the analogously numbered components of the first described embodiment. This compartment configuration is particularly useful where the flow in the main duct is relatively low, when the compartment need not be longer than according to FIGS. 1 to 3, and its diameter optimally small so long as the fluid flow is not restricted. In embodiments according to FIGS. 7 and 8, the compartment with fluid supply and discharge through stubs 121, 122 at extreme opposite ends thereof, together with the eccentric location of cylinder and piston near the wall where the proximity device 152 is located, provide for fluid deflection and distribution for the purpose of temperature compensation in a manner similar to that explained with reference to FIG. 4.

In both embodiments, an adjustable nut 42.1 (FIG. 2) can be provided on a thread of the stud 42 and a corresponding stop 42.2 on the supporting structure. This nut and stop arrangement has the purpose of adjustably limiting the travel of the push rod 45 in conjunction with the cycling movement which is controlled by the indicating apparatus of the complete installation.

Under certain conditions, for example oblique cylinder and piston installation, particularly heavy fluid, or especially precise cycling requirements independent of gravity or spring action, the embodiment shown in FIG. 9 provides satisfactory operation.

In FIG. 9 the arrangement of fluid supply and discharge as well as of the cylinder and piston gap with proximity device, is quite similar to that described with reference to FIGS. 1 to 8. As distinct from the two previously described embodiments, the embodiment according to FIG. 9 has two stuffing boxes 235 and 236 and two push rods 245 and 246 at opposite ends of the compartment 216. The stuffing box 235 is mounted similar to 35 of FIG. 2, and stuffing box 236 is screwed into a plug 277, accommodating the second push rod 246. As indicated by corresponding numerals, this construction is otherwise essentially analogous to that of FIGS. 7 and 8 and requires no detailed description.

For operating the two push rods 245 and 246 of FIG. 9 in the exact cycle desired, they are controlled by two electropneumatic control devices of conventional design, indicated at 241 and 242. Both push rod controls are energized and programmed from the indicating component by way of the electric leads 298 and 299 and energized from 298, 299. As mentioned above, the indicating and cycle controlling apparatus is that described in my above cited U.S. Pats. No. 3,304,765 and No. 3,371,552, which are herewith incorporated as part of the present description. It will be evident to those skilled in the art that the control impulses for electropneumatic apparatus 241 and 242 are supplied by way of connections analogous to I, II of the above patents.

It will be evident that the construction according to FIGS. 1 to 5 provides especially thorough temperature equalization within a comparatively short compartment, whereas the compartment of the somewhat simpler embodiment according to FIGS. 7, 8 and 9 is longer and provides a less tortuous but often satisfactory fluid path.

Still another embodiment will now be described with reference to FIG. 10. This embodiment dispenses with the compartment means of FIGS. 1 to 9 as well as the baffle plate of FIGS. 1 to 5. It is particularly inexpensive as to parts required and assembly, but is satisfactory under less exacting conditions.

In FIG. 10, the measuring cylinder 326 with piston 361 inserted directly in the duct 320 transversely thereto, and in order to provide an equalizing fluid path it has one or two openings 370 almost as high as the width of the duct, and facing a duct wall or walls. The construction of the cylinder which here also serves as fluid compartment, of the piston with proximity detector, and of the push rod with stuffing box and electropneumatic control are quite similar to the corresponding components of FIGS. 1 to 9 and similarly labeled.

The operation of the above-described embodiments of my invention is as follows.

The piston assembly as described and shown is periodically moved by the push rod moving towards the open end of the cylinder. A sample of the fluid is thus drawn through the clearance between the piston and the inside of the cylinder, into the space next to the other, closed, end of the cylinder.

The push rod is then quickly withdrawn allowing the piston assembly to fall by gravity, or to be moved by the spring according to FIG. 5. Analogously, the second push rod 246 according to FIG. 9 can be used for purposes of the measuring stroke. In either instance, the fluid sample is expelled through the same path as it entered, namely via the measuring gap and the cylinder opening such as 72 of FIG. 4. The rate of fall or of positively controlled movement is a measure of viscosity with the clearance between the piston and they cylinder forming the measuring orifice. The detected time of measuring movement starts when the push rod is withdrawn, for example when compressed air is shut off at 41, and ends when the piston magnet 62 operates the proximity switch body 66. It will be evident that the relative location of bodies 62 and 66 has to be adjusted in conventional manner to provide proper cycling periods.

The reverse flushing from the normal motion of the piston provides effective self-cleaning during operation, with the piston drawing the fluid through the gap during the return stroke to initial measuring position.

It should be understood that the present disclosure is for the purpose of illustration only and that this invention includes all modifications and equivalents which fall within the scope of the appended claims.

I claim:

1. Apparatus for measuring the viscosity of a fluid moving in a duct, wherein a measuring body in its measuring phase moves against resistance of the fluid in a gap for detection of viscosity dependency of the movement and transmittal thereof to indicating means responsive to the rate of such movement, comprising:

compartment means communicating with said duct in the flow path defined by the duct;

means for preventing communication of said compartment means with regions external to said duct;

measuring means within said compartment means including an envelope having a port near the initial measuring position, and a measuring body contained completely within the envelope for reciprocation therein with envelope and body defining said gap, the envelope being transverse of said flow path for deflecting and distributing the fluid flow within the compartment means around and along the envelope, for compensating at the gap for temperature variation of the fluid in the duct; and means extending into said envelope for moving said measuring body within said envelope to said initial measuring position, said moving means being out of contact with said measuring body when said measuring body moves in its measuring phase.

2. Apparatus according to claim 1 further including baffle means within said compartment means parallel to said envelope.

3. Apparatus according to claim 2 wherein said baffle means extends essentially diametrically across the compartment means and stops short of a compartment means wall to provide entry of the fluid around the envelope.

4. Apparatus according to claim 2 wherein said baffle is sealed to the compartment means near the port of the envelope and distanced from the compartment means opposite the port.

5. Apparatus according to claim 2 wherein said compartment is tubular transverse of the duct with openings for the duct and with a cover at each end adjacent said openings, one cover carrying said baffle means and the other cover carrying said envelope.

6. Apparatus according to claim 1 further comprising detecting means outside said compartment means in proximity to a wall thereof, said envelope being mounted within the compartment means to locate it in proximity to the detecting means.

7. Apparatus according to claim 1 wherein said duct communicates with said compartment means through entry and discharge openings which are distanced in the direction of reciprocation for location near respective end positions of said measuring body to enhance said temperature compensation.

8. Apparatus according to claim 1 wherein said moving means includes a push rod at one end of the measuring body entering through a wall of said compartment means into said envelope for moving said measuring body within the envelope into position ready for measuring.

9. Apparatus according to claim 8 further including means for urging the measuring body against the force exerted by the push rod.

10. Apparatus according to claims 8 wherein said push rod enters through a wall of the compartment means at said fixed other end of said tube.

11. Apparatus according to claim 1, wherein said moving means includes two push rods one at each end of the measuring body entering through respective walls of said compartment means into said envelope for controllably moving said measuring body during measuring movement and back into position ready for measuring.

12. Apparatus according to claim 11 further combined with control gear for cyclically moving said two push rods, one for moving the measuring body into position ready for measuring movement and the other for driving the body while it moves against fluid resistance.

13. Apparatus according to claims 11 wherein one of said push rods enters through said open end of said tube and the other push rod enters at said fixed end of the tube.

14. Apparatus according to claim 1 wherein said port of said envelope includes an open end of the envelope and an aperture adjacent said open end.

15. Apparatus according to claim 1 wherein said envelope includes a cylindrical tube which opens at one end into the compartment means and is at the other end fixed to the compartment means.

16. Apparatus according to claim 15 wherein said means for moving said measuring body includes a push rod and said push rod enters through a wall of the compartment means at said fixed other end of said tube.

17. Apparatus according to claim 15 wherein said means for moving said measuring body includes two push rods and one of said push rods enters through said open end of said tube and the other push rod enters at said fixed end of the tube.

18. Apparatus for measuring the viscosity of a fluid moving in a duct wherein a measuring body moves against resistance of the fluid in a gap for detection of viscosity dependency of the movement and transmittal thereof to indicating means responsive to the rate of such movement, comprising:

compartment means communicating with said fluid;

measuring means including an envelope transversely extending into said duct and having a port communicating with the fluid in the duct, and a measuring body contained within the envelope for reciprocation therein with envelope and body defining said gap; and two push rod means reaching into said envelope coaxially with said reciprocation of the measuring body, one push rod means entering at each end of the measuring body entering through respective ends of said envelope for controllably moving said measuring body during measuring movement and back into position ready for measuring.

19. Apparatus for measuring the viscosity of a fluid flowing in a duct, wherein a measuring body in its measuring phase moves against resistance of the fluid in a gap for detection of viscosity dependency of the movement and transmittal thereof to indicating means responsive to the rate of such movement, comprising:

measuring means including an envelope transversely extending into said duct and having a port communicating with the fluid in the duct, and a measuring body contained completely within the envelope for reciprocation therein with envelope and body defining said gap, the envelope and its port deflecting and distributing the fluid flow path defined by the duct around, within and along the envelope, to conform temperature variation at the gap to the temperature of the fluid in the duct;

means for preventing communication of said envelope with regions external to said duct; and means extending into said envelope for moving said measuring body within said envelope to said initial measuring position, said moving means being out of contact with said measuring body when said measuring body moves in its measuring phase.

20. Apparatus according to claim 19 wherein said moving means include a push rod extending through the envelope into contact with said measuring body for moving the body.

21. Apparatus according to claim 19 wherein said envelope extends at both ends beyond said duct and wherein said port extends between the regions of intersection between envelope and duct.

22. Apparatus according to claim 19 further comprising distancing bodies within the measuring gap for maintaining the gap dimension during the detecting movement.

* * * * *